Patented June 20, 1939

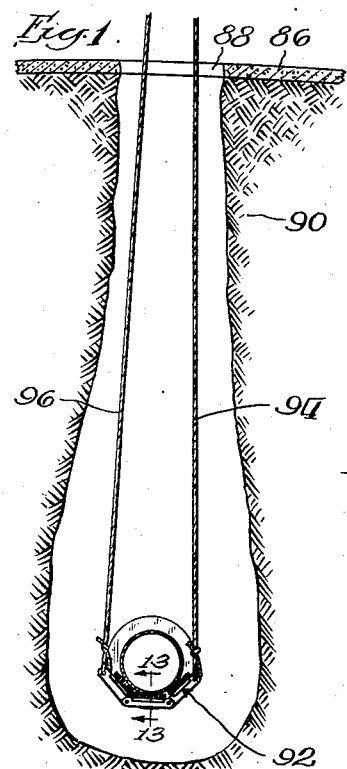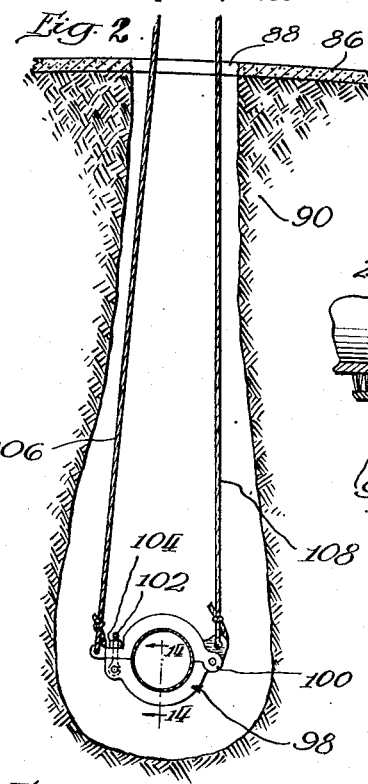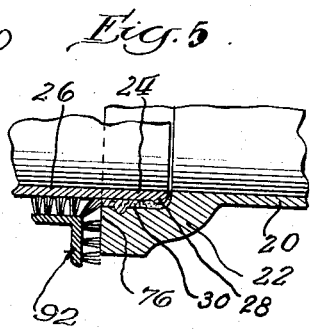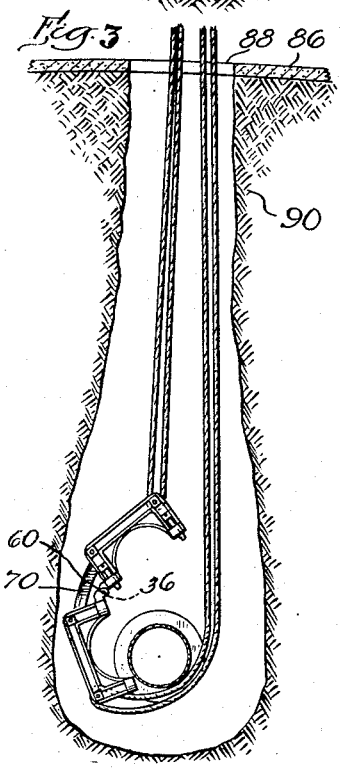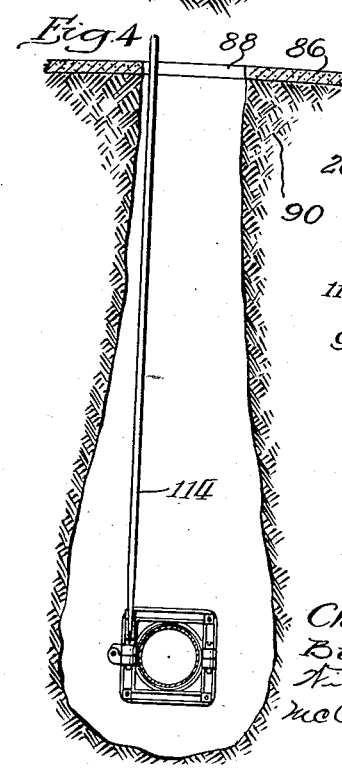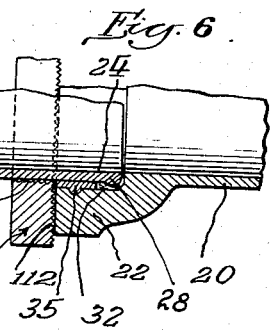

2,163,261

UNITED STATES PATENT OFFICE 2,163,261

METHOD OF APPLYING PIPE JOINT CLAMPS

Charles E. Norton, Chicago, Ill., assignor to Norton-McMurray Manufacturing Company, Chicago, Ill., a corporation of Illinois Application September 3, 1938, Serial No. 228,421

5 Claims. (Cl. 138—97)

My invention relates to pipe joint clamps and method of applying same.

In the cities and villages throughout the United States there are thousands of miles of gas pipe having bell and spigot joints which are sealed with lead or other suitable material. As a result of ground settlement, vibration due to trucks and other heavy vehicles, and for other miscellaneous causes, leakage of gas frequently occurs at these joints. This leakage results in loss of valuable gas, damage to vegetation adjacent the leak, and fire hazard. Wherefore, it is customary for the gas companies to repair such leaks promptly.

Such repair is effected either by digging a hole in the street or pavement down to the leak so that a man or men can either reseal the leak by removing the sealing material and replacing it with new material, or by applying a pipe joint clamp in lieu of replacing the sealing material. It is more common at present to apply a pipe joint clamp for the purpose of sealing the leak than it is to replace the sealing material in the pipe joint.

In either event, it is necessary to dig a hole in the pavement of the street or sidewalk large enough to permit a man to enter the hole and make the necessary repair. In fact, it is essential that the hole in the pavement of the street or sidewalk be somewhat larger than necessary to admit a man in order that he will have sufficient ventilation to prevent him from being overcome by the escaping gas. Even so, the repair of gas main leaks by present methods is expensive, dangerous and unhealthy.

An object of my invention is to permit the repair of leaks in underground piping through a hole in the pavement much smaller than that heretofore necessary.

Another object of my invention is to eliminate the health hazard heretofore present in making such repairs and to permit the repair to be made by a workman standing on the pavement.

Another object of my invention is to reduce the cost of repairing leaks in underground piping.

Another object of my invention is to reduce the time consumed in repairing underground piping.

In my divisional application, Serial No. 270,337, filed April 27, 1939, I disclose and claim one form of pipe clamp adapted to be used in carrying out the method claimed in the instant application.

Other objects and advantages will become apparent as the description proceeds.

Figures 1, 2, 3 and 4 are diagrammatic views showing my novel method of applying a pipe clamp to the bell and spigot joint of a gas main; Figure 1 shows the preparatory step of brushing the joint surfaces clean; Figure 2 shows the preparatory step of filing these surfaces; Figure 3 shows the lowering of a pipe clamp into position about the pipe; and Figure 4 shows the manner in which the pipe clamp is secured in sealing engagement about the pipe;

Figure 5 is a sectional view of the brush shown in Figure 1 and is taken on the line 13—13 of Figure 1; and Figure 6 is a sectional view of the file illustrated in Figure 2 and is taken on the line 14—14 of Figure 2.

Referring to Figures 5 and 6, I have illustrated a bell and spigot type of pipe joint wherein the pipe 20 has a bell 22 providing a socket for receiving the spigot end 24 of a second pipe 26. The spigot end 24 terminates in a bead 28 and an annular space 30 is provided between the interior of the bell 22 and the adjacent surface of the spigot end 24. This space is adapted to be filled by any suitable sealing means. In the particular instance, I have illustrated the seal as being effected by a yarn packing 32 and lead 35, although it is to be understood that these substances are selected for illustration only and that my invention is independent of the particular sealing material used.

Lead, cement, and the other sealing materials commonly used to seal such bell and spigot joints have little or no resiliency and where the pipe joint is subjected to vibration or strains due to other causes, the sealing material frequently cracks and leakage of gas results.

In illustrating my novel method of applying a clamp to a pipe located beneath the surface of the ground, I have shown the particular clamp disclosed in my said divisional application. This clamp is disclosed in detail in the divisional application and it will suffice herein to point out that the clamp comprises a split anchor ring whose two sections are pivotally connected by a metal hinge pin 36 (Fig. 3) and a split follower ring whose two sections are connected by a wooden hinge pin 60. The anchor ring and follower ring are provided with cap screws for securing the two sections of each ring firmly about the pipe joint when the clamp is in place. The anchor and follower rings are connected by bolts provided with nuts which can be tightened up to shorten the distance between the follower ring and anchor ring and thus press the rubber ring 70 into sealing engagement with the adjacent surfaces of the two pipe sections to seal a leak in the joint.

In the drawing I have illustrated the pavement 86 of a typical street or sidewalk below which the gas main is located. With my improved method of applying a clamp to a gas main or other underground pipe, it is only necessary to make a hole 88 in the pavement 86 which has a width and length sufficient to admit the clamp to be applied to the pipe.

Since the cost of digging a hole is almost directly proportional to the volume of material removed, my invention makes it possible to materially reduce the cost of digging the hole. Where the hole is dug into the soil 90 below the paving 86, the hole is enlarged at the point where it surrounds the gas main to provide a small space beneath and on both sides of this main.

After the hole is dug, the next step is to clean the surfaces of the pipe joint which will be engaged by the sealing ring of the clamp. In Figure 1 I have shown a wire brush 92 being used for this purpose. The brush 92 consists of three or more hinged sections which are held against the pipe joint and oscillated by means of ropes 94 and 96 extending above the surface of the ground. In this way the lower half of the pipe joint can be readily cleaned of dirt and other impurities. Referring particularly to Figure 5, it will be noted that the wire brush 92 is L-shaped in cross-section and cleans both the face 76 of the bell 22 and the adjacent outer surface of the pipe 26.

To clean the upper half of the pipe joint it is only necessary to place the brush 92 on the top, instead of the bottom, of the gas main and to replace the ropes 94 and 96 by rigid rods so that the brush can be oscillated while in contact with the upper half of the pipe joint.

After the sealing surfaces of the pipe joint have been cleaned by means of a wire brush, it is usually necessary to file these surfaces and this I accomplish by means of the file 98 illustrated in Figures 2 and 6. This file may consist of a pair of semi-circular sections which are hinged together as indicated at 100 and which may be secured in place about the pipe by bolt 102 which is pivoted to the lower section and may be swung in a slot in the upper section, whereupon a nut 104 is advanced to lock the sections of the file together.

After the file 98 has thus been placed around the pipe joint, it is oscillated by means of ropes 106 and 108 extending above the surface of the ground. As shown in Figure 6, the file 98 has teeth 110 on its inner periphery and also teeth 112 on the surface which engage the end of the bell 22 so that both sealing surfaces of the pipe joint are filed simultaneously.

Figure 3 illustrates the manner in which the clamp claimed in my divisional application is lowered into the hole and placed about the pipe joint. It is to be noted that all of the cap screws are retracted so that their threaded ends engage the threads in the bosses forming parts of the upper halves of the anchor and follower rings and that the free ends of these halves are separated to permit the clamp to be placed about the pipe joint. The halves of the anchor ring are held together by their metal pivot 36 and the halves of the follower ring are held in pivoted relationship by the wooden pin 60.

After the clamp has been placed about the pipe joint, the cap screws are advanced by means of a long screw driver 114 to lock the two halves of the anchor and follower rings firmly together.

In this particular clamp the follower ring has two cap screws which lock both ends of the two halves of the ring together to secure a continuous firm support for the rubber sealing ring 70 and the wooden hinge pin 60 yields to permit the adjacent ends of the follower ring to be brought into direct contact by the cap screw 66. The follower ring has a single cap screw and the metal hinge 36 is relied upon to hold the other ends of the two halves of the follower ring together.

After the cap screws have been advanced to final position, a long open end ratchet wrench is lowered into the hole and successively engages and advances the nuts on the bolts which connect the anchor and follower rings. This brings the follower ring into engagement with the rear of bell 22 of pipe section 28 and urges rubber sealing ring 70 into firm sealing engagement with the sealing surface 76 of the bell 22 and the adjacent outer surface of the pipe section 26.

I have shown the tools for cleaning the pipe joint and for securing my novel clamp in place only diagrammatically, as it is my intention to make certain of these tools the subject matter of separate patent applications.

It will be noted that in practicing my invention, the clamp which is lowered into the hole is complete and nothing need be added. In actual use I have found it to be entirely practicable to apply a clamp to a 12" gas main through a pavement opening less than a foot square.

While I have described my invention as particularly desirable for repairing leaks in gas mains, it is to be understood that my invention may be applied to piping used for other purposes and is not limited to the repair of gas mains. Furthermore, my novel method is not limited to the application of the particular clamp shown but may be carried out by applying other types of clamps either to bell and spigot type joints or to other joints or to seal leaks occurring intermediate the ends of the individual pipe sections.

I claim:

1. That method of repairing a leak in a pipe located in the ground beneath a paved surface which comprises forming an opening in the pavement by removing an area of pavement too small to admit a man, digging a hole in the ground from this opening to the leak in the pipe, cleaning a pipe surface adjacent the leak by a tool manipulated from the surface of the pavement, lowering a hinged clamp into position about the leak in the pipe by ropes manipulated from the surface of the pavement, and securing said clamp in sealing position about said leak by tools manipulated from the surface of the pavement.

2. That method of applying a clamp to a pipe located in the ground beneath a pavement, which comprises digging a hole in the pavement of a length and breadth approximately equal to the width of the clamp measured in an axial direction, digging a tapered hole, connecting the hole in the pavement with the pipe adjacent the point at which the clamp is to be applied, lowering the clamp into the hole, and applying the same to the pipe by tools manipulated from the pavement.

3. That method of repairing a leak in a pipe located beneath the surface of the ground, which comprises digging a hole from the surface of the ground to the leak in the pipe, lowering a complete unitary clamp into said hole and applying said clamp to the pipe by means of tools manipulated from the surface of the ground.

4. That method of repairing a leak in a pipe located beneath the surface of the ground which comprises digging a hole from the surface to the pipe adjacent the part to be repaired, said hole having a cross-section less than one foot square adjacent the surface of the ground, lowering a clamp into said hole and applying the same to the pipe by ropes manipulated from the surface of the ground, and securing said clamp in sealing engagement with said pipe by tools manipulated from the surface of the ground.

5. That method of applying a clamp incorporating sealing means to a pipe located beneath the surface of the ground for the purpose of repairing a leak in said pipe which is carried out from the surface of the ground and comprises digging a hole from the surface of the ground to the pipe to expose an annular portion thereof including that part in which the leak is located, lowering a clamp from the surface of the ground into said hole, and arranging said clamp about said pipe to encircle the exposed part of the pipe which contains the leak and firmly securing said clamp in sealing engagement with said pipe to stop said leak by tools manipulated from the surface of the ground.

CHARLES E. NORTON.